United States Patent
Chen et al.

(10) Patent No.: US 7,872,713 B2
(45) Date of Patent: Jan. 18, 2011

(54) PIXEL STRUCTURE HAVING PARTICULAR PATTERNED DIELECTRIC LAYER WITH MICRO-BUMPS

(75) Inventors: Cho-Yan Chen, Hsinchu (TW);
Seok-Lyul Lee, Hsinchu (TW);
Tun-Chun Yang, Hsinchu (TW);
Ching-Huan Lin, Hsinchu (TW);
Chih-Ming Chang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 479 days.

(21) Appl. No.: 12/060,275

(22) Filed: Apr. 1, 2008

(65) Prior Publication Data
US 2009/0102996 A1    Apr. 23, 2009

(30) Foreign Application Priority Data
Oct. 17, 2007   (TW) ............................... 96138840 A

(51) Int. Cl.
*G02F 1/1335*   (2006.01)
*G02F 1/1343*   (2006.01)
*G02F 1/136*    (2006.01)

(52) U.S. Cl. ........................... 349/114; 348/38; 348/46; 348/43

(58) Field of Classification Search ................. 349/114, 349/38, 46, 43
See application file for complete search history.

(56) References Cited

U.S. PATENT DOCUMENTS

| 6,753,934 B2 | 6/2004 | Park et al. |
| 7,439,541 B2 * | 10/2008 | Lee et al. ....................... 257/59 |
| 7,605,889 B2 * | 10/2009 | Lee et al. .................... 349/113 |
| 2005/0110927 A1 | 5/2005 | Sakamoto et al. |

FOREIGN PATENT DOCUMENTS

| CN | 1637548 | 7/2005 |
| CN | 1731256 | 2/2006 |

* cited by examiner

*Primary Examiner*—Mike Qi
(74) *Attorney, Agent, or Firm*—Jianq Chyun IP Office

(57) ABSTRACT

A pixel structure disposed on a substrate and electrically connected to a scan line and a data line is provided. The pixel structure has a reflective area and includes a common line, a semiconductor lower electrode, an upper electrode, a patterned dielectric layer, a reflective electrode and an active device. The semiconductor lower electrode electrically connected to the common line is disposed on the substrate within the reflective area. The upper electrode is disposed above and electrically isolated from the semiconductor lower electrode. The patterned dielectric layer with the micro-bumps is disposed on the upper electrode and exposes a part of the upper electrode. The reflective electrode is disposed on the patterned dielectric layer and the part of the upper electrode. Besides, the reflective electrode is electrically connected to the upper electrode. The active device is electrically connected to the scan line, the data line and the reflective electrode.

12 Claims, 4 Drawing Sheets

PIXEL STRUCTURE HAVING PARTICULAR PATTERNED DIELECTRIC LAYER WITH MICRO-BUMPS

CROSS-REFERENCE TO RELATED APPLICATION

This application claims the priority benefit of Taiwan application serial no. 96138840, filed on Oct. 17, 2007. The entirety the above-mentioned patent application is hereby incorporated by reference herein and made a part of specification.

BACKGROUND OF THE INVENTION

1. Field of the Invention

The present invention relates to a liquid crystal display (LCD) panel, and more particularly to a pixel structure.

2. Description of Related Art

In current society, the development of multi-media technologies relies much on the progress of semiconductor devices or display apparatuses. As regards displays, LCDs with advantages such as high definition, favorable space utilization, low power consumption and no radiation have gradually become the mainstream of the market. Generally, the LCDs can be classified into transmissive LCDs, reflective LCDs, and transflective LCDs. The transflective LCDs can be used on any condition whether sufficient illumination or not, thus having a wide application scope.

On the other hand, the transflective LCD is often designed to have different cell gaps at the transmissive area of the transflective LCD and at the reflective area thereof. In other words, the transflective LCD usually has a dual cell gap. The transflective LCD with the dual cell gap raises the complexity in the fabrication thereof. Moreover, due to the dual cell gap, the light transmittance therebetween is rather unsatisfactory, thus reducing the overall aperture ratio of the transflective LCD.

In view of the above, a micro-reflective LCD categorized as one of the transflective LCDs has been proposed. In general, metal wires on a thin film transistor (TFT) array substrate in the transflective LCD reflect the incident light irradiating from outside light sources to reach a micro-reflectivity of 1~2%. Here, the metal wires include TFTs, scan lines, data lines, common lines, and so on. In the micro-reflective LCD, a flat reflective layer is additionally disposed on a dense metal-wiring area on the TFT array substrate, so as to increase the light reflectivity to the outside light sources. In addition, the flat reflective layer of the micro-reflective LCD and the metal wires disposed thereunder may comprise a storage capacitor.

FIG. 1 is a schematic view illustrating a structure of a storage capacitor of a micro-reflective LCD. Referring to FIG. 1, the structure 100 of the storage capacitor includes a flat reflective layer 110, an inter-layer electrode 120, and a lower electrode 130. The flat reflective layer 110 electrically connected to a TFT (not shown) has a voltage Vp and is connected to the lower electrode 130. The inter-layer electrode 120 electrically connected to a common line (not shown) has a voltage Vc. A storage capacitor C1 is thus formed between the flat reflective layer 110 and the inter-layer electrode 120, while a storage capacitor C2 is formed between the inter-layer electrode 120 and the lower electrode 130.

However, the reflectivity of the micro-reflective LCD does not completely comply with actual demands. For example, information performed on the micro-reflective LCD cannot be identified in an ambiance of strong light, and thus a diffusion adhesive is usually added to an upper polarizer of the micro-reflective LCD to increase the light reflectivity reflected by the flat reflective layer. As a result, a viewer is able to clearly observe the information displayed by the micro-reflective LCD.

SUMMARY OF THE INVENTION

In light of the foregoing, the present invention is directed to a pixel structure of a relatively high reflectivity.

To embody the present invention, a pixel structure disposed on a substrate and electrically connected to a scan line and a data line is provided by the present invention. The pixel structure has a reflective area and includes a common line, a semiconductor lower electrode, an upper electrode, a patterned dielectric layer, a reflective electrode, and an active device. The semiconductor lower electrode electrically connected to the common line is disposed on the substrate within the reflective area. The upper electrode is disposed above and electrically isolated from the semiconductor lower electrode. The patterned dielectric layer having a plurality of micro-bumps is disposed on the upper electrode and exposes a part of the upper electrode. The reflective electrode is disposed on the patterned dielectric layer and the part of the upper electrode. Besides, the reflective electrode is electrically connected to the upper electrode. The active device is electrically connected to the scan line, the data line and the reflective electrode.

According to an embodiment of the present invention, the pixel structure further includes a transmissive area and a pixel electrode disposed in the transmissive area. The pixel electrode is electrically connected to the reflective electrode.

According to an embodiment of the present invention, the pixel structure further includes a gate insulating layer disposed between the upper electrode and the semiconductor lower electrode, so as to form a storage capacitor between the semiconductor lower electrode and the upper electrode.

According to an embodiment of the present invention, the patterned dielectric layer further includes a first contact hole through which the reflective electrode is electrically connected to the active device.

According to an embodiment of the present invention, the patterned dielectric layer further includes a second contact hole through which the semiconductor lower electrode is electrically connected to the common line.

According to an embodiment of the present invention, the active device includes a top-gate TFT.

According to an embodiment of the present invention, the active device has a semiconductor layer including a drain region connected to the reflective electrode. The active device is electrically connected to the reflective electrode through the drain region. According to another embodiment of the present invention, the semiconductor lower electrode and the semiconductor layer of the active device consist of a same thin film.

According to an embodiment of the present invention, the material of the semiconductor lower electrode comprises polysilicon.

According to an embodiment of the present invention, the material of the upper electrode is the same as the material of the reflective electrode.

According to an embodiment of the present invention, the material of the reflective electrode comprises aluminum, molybdenum, or titanium.

According to an embodiment of the present invention, the reflective electrode is in conformity with the patterned dielectric layer.

Based on the above, the patterned dielectric layer with a plurality of the micro-bumps is employed in the present invention. And the reflective electrode deposited on the patterned dielectric layer is in conformity with the patterned dielectric layer. Therefore, the surface shape of the reflective electrode is conformal to the shape of the patterned dielectric layer with a plurality of the micro-bumps. In comparison with the related art, the present invention improves the light reflectivity. Moreover, according to the embodiment of the present invention, the semiconductor lower electrode and the upper electrode are electrically connected to the common line and the active device, respectively. Thereby, the storage capacitor is formed between the semiconductor lower electrode and the upper electrode. The above-mentioned design is distinctive over the design of a conventional storage capacitor.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
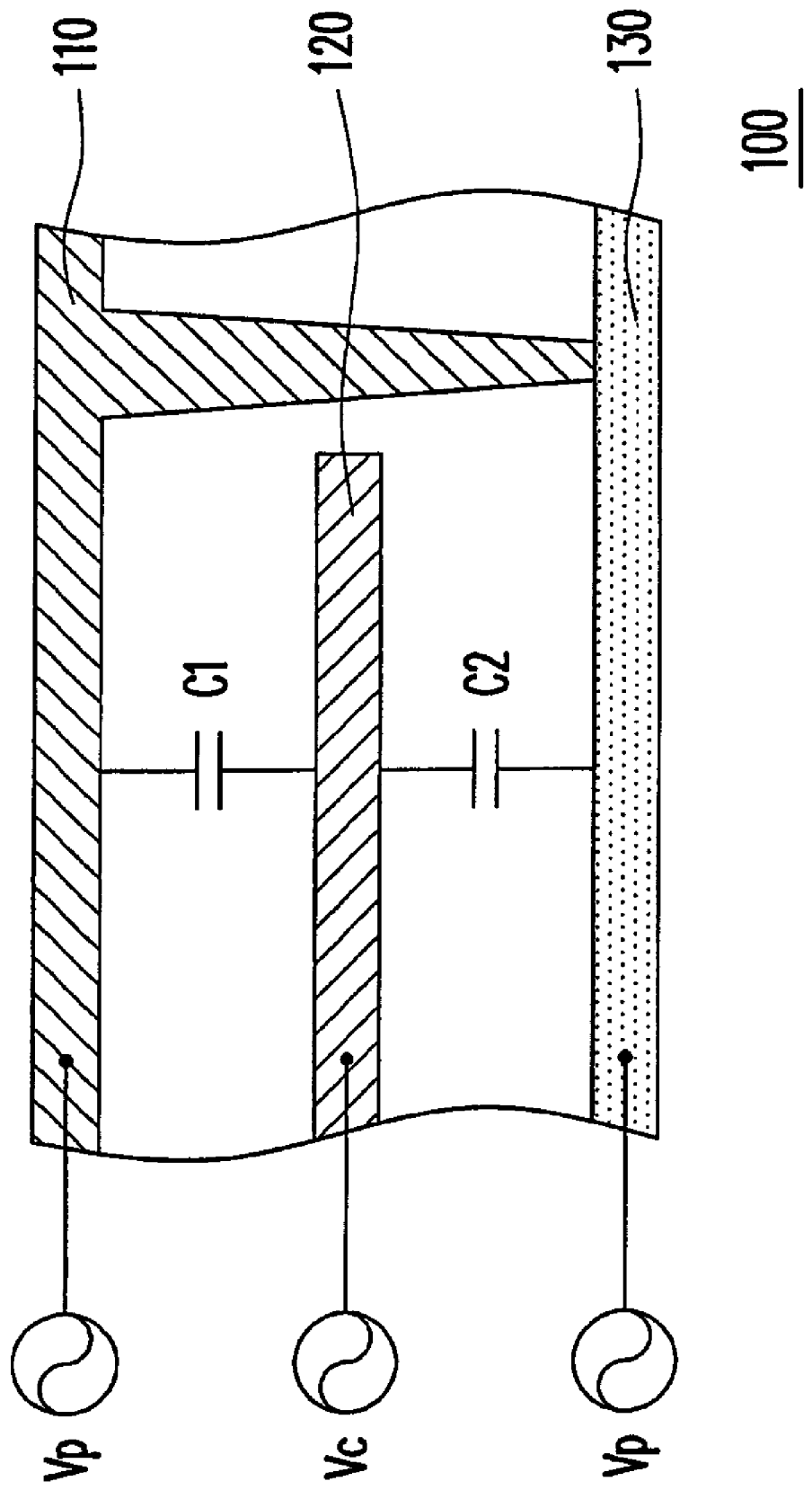
FIG. 1 is a schematic view illustrating a storage capacitor of a micro-reflective LCD.
Figure 2A:
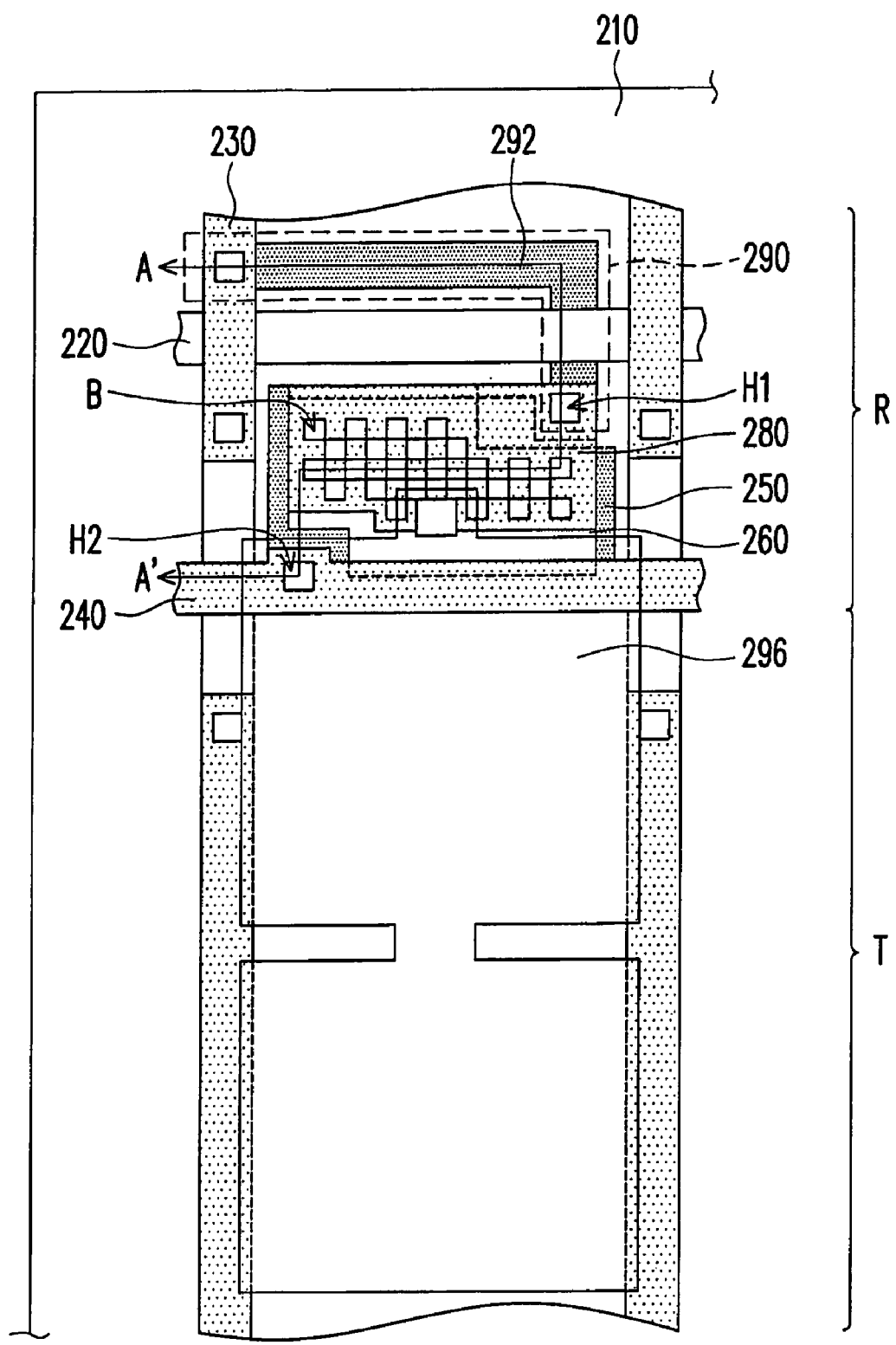
FIG. 2A is a schematic view of a pixel structure according to one embodiment of the present invention.
Figure 2B:
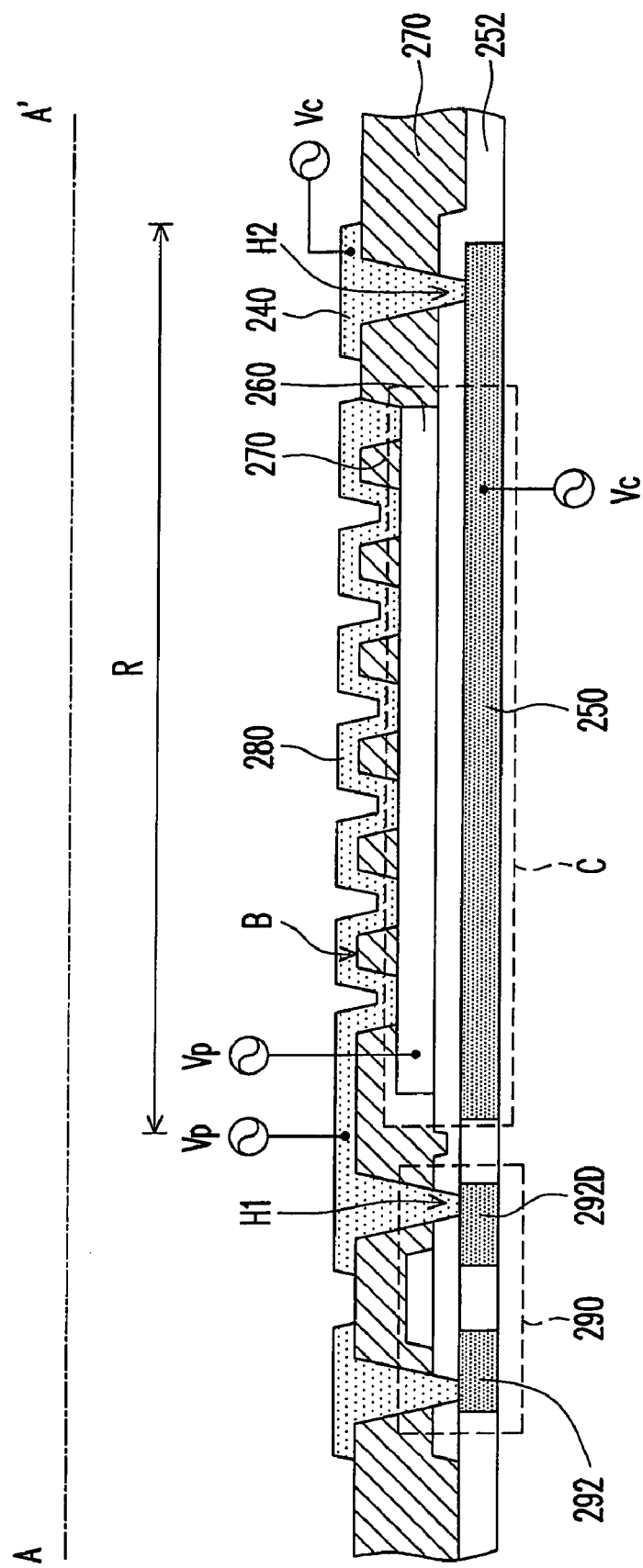
FIG. 2B is a cross-sectional view of FIG. 2A along a line A-A'.

FIG. 2A is a schematic view of a pixel structure according to one embodiment of the present invention. FIG. 2B is a cross-sectional view of FIG. 2A along a line A-A'. Referring to FIGS. 2A and 2B together, a pixel structure 200 is disposed on a substrate 210 and electrically connected to a scan line 220 and a data line 230. The pixel structure 200 has a reflective area R and includes a common line 240, a semiconductor lower electrode 250, an upper electrode 260, a patterned dielectric layer 270, a reflective electrode 280, and an active device 290. As shown in FIG. 2B, the semiconductor lower electrode 250 electrically connected to the common line 240 is disposed on the substrate 210 within the reflective area R. The upper electrode 260 is disposed above and electrically isolated from the semiconductor lower electrode 250. The patterned dielectric layer 270 with a plurality of micro-bumps B is disposed on the upper electrode 260 and exposes a part of the upper electrode 260. The reflective electrode 280 is disposed on the patterned dielectric layer 270 and the part of the upper electrode 260, wherein the reflective electrode 280 deposited on the patterned dielectric layer 270 is in conformity with the patterned dielectric layer 270. Besides, the reflective electrode 280 is electrically connected to the upper electrode 260. The active device 290 is electrically connected to the scan line 220, the data line 230 and the reflective electrode 280. In the present embodiment, the pixel structure 200 further includes a transmissive area T and a pixel electrode 296 disposed in the transmissive area T. The pixel electrode 296 is electrically connected to the reflective electrode 280.

It should be noted that the reflective electrode 280 is in conformity with the patterned dielectric layer 270 with the plurality of the micro-bumps B. And the material of the reflective electrode 280 is, for example, aluminum, molybdenum, titanium, or any other conductive materials. The surface shape of the reflective electrode is not only able to improve reflective areas to the incident light irradiating from the outside light sources, but also able to adjust a widespread reflecting directions of light. Hence, a viewer is apt to observe the light reflected by a flat reflective layer. In comparison with a conventional reflective electrode, the reflective electrode 280 proposed by the present embodiment is of a greater light reflectivity without additionally utilizing a diffusion adhesive, thus reducing manufacturing costs.

Referring to FIGS. 2A and 2B, the patterned dielectric layer 270 further includes a first contact hole H1 and a second contact hole H2. The reflective electrode 280 is electrically connected to the active device 290 through the first contact hole H1, whereas the semiconductor lower electrode 250 is electrically connected to the common line 240 through the second contact hole H2. In particular, the plurality of the micro-bumps B can be simultaneously formed along with the first contact hole H1 and the second contact hole H2 during the regularly-defined fabrication process of the patterned dielectric layer 270. In other words, the micro-bumps B fabrication can be completed without increasing the number of photomasks required by the regular fabrication process. Thereby, the light reflectivity is significantly improved without increasing manufacturing costs.

In addition, as shown in FIG. 2B, the pixel structure 200 further includes a gate insulating layer 252 disposed between the upper electrode 260 and the semiconductor lower electrode 250, so as to form a storage capacitor C between the semiconductor lower electrode 250 and the upper electrode 260. Specifically, a voltage transmitted by the common line 240 is assumed as Vc, while a voltage transmitted by the data line 230 is assumed as Vp. The voltage Vp is inputted into the reflective electrode 280 through the turned-on active device 290. As such, the gate insulating layer 252, the semiconductor lower electrode 250 having the voltage Vc, and the upper electrode 260 having the voltage Vp together form the storage capacitor C, so as to stabilize the voltage Vp of the pixel structure 200 and to further improve display qualities.

Referring to FIG. 2B, the active device 290 has a semiconductor layer 292 including a drain region 292D connected to the reflective electrode 280. Through the drain region 292D, the active device 290 is electrically connected to the reflective electrode 280. According to the present embodiment, the active device 290 is, for example, a top-gate TFT. Note that the semiconductor lower electrode 250 and the semiconductor layer 292 of the active device 290 consist of a same thin film, such as polysilicon, for example. Therefore, the fabrication of the semiconductor lower electrode 250 can also be completed together with the semiconductor layer 292 fabrication and no additional manufacturing costs are required. Besides, the material of the upper electrode 260 may be selected from the same material of the reflective electrode 280.

Figure 3:
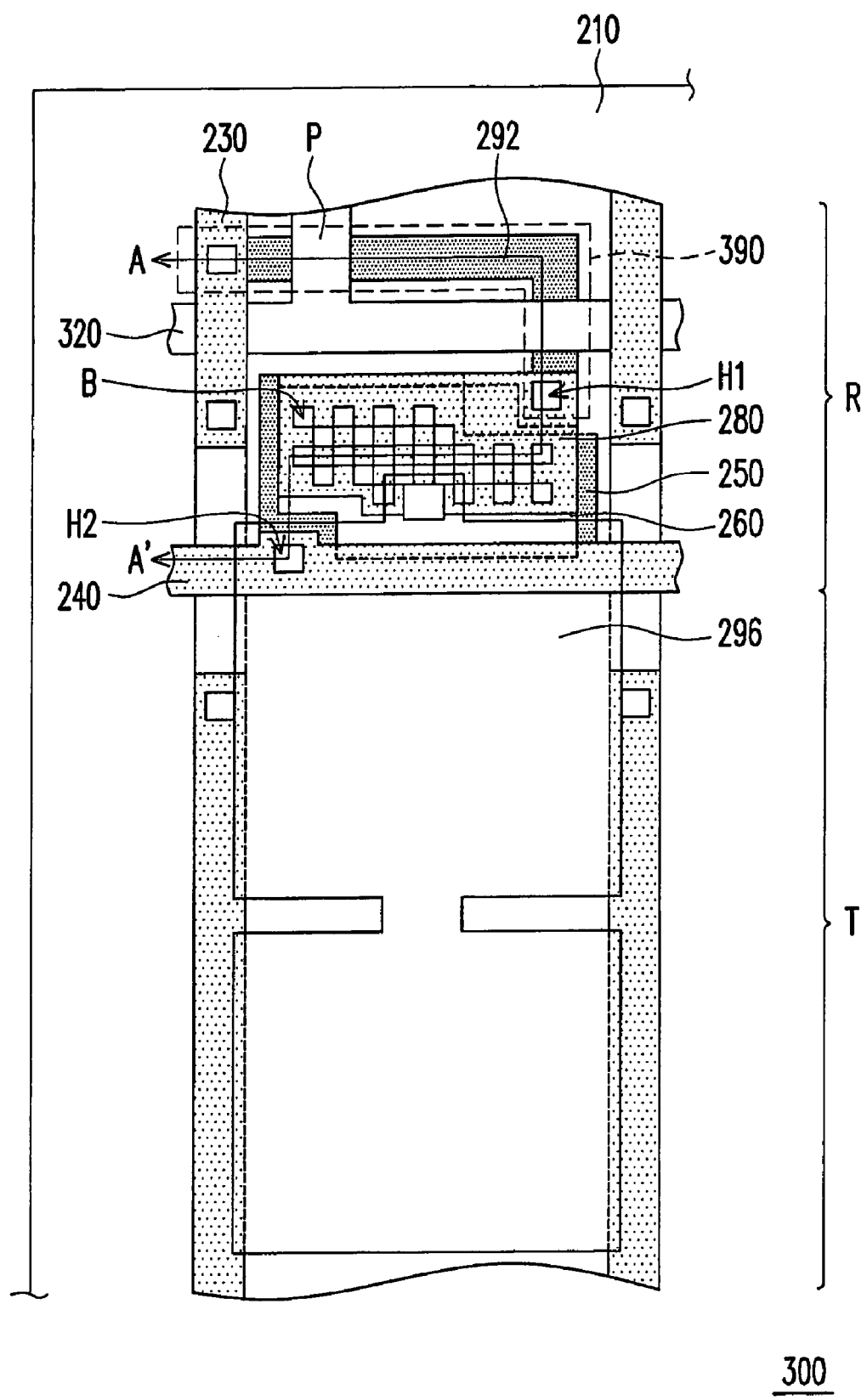
FIG. 3 is a schematic view of another pixel structure according to another embodiment of the present invention.

Practically, in consideration of the current leakage reduction of the active device or the other issues, a layout of a scan line 320 may be designed in the same manner as shown in FIG. 3. The scan line 320 in a pixel structure 300 has a protrusion P, indicating that an active device 390 is designed as a dual-gate TFT. Based on the foregoing, the layout of the scan line and the type of the active device are not limited in the present invention. Besides, the other components of the pixel structure 300 according to the present embodiment are similar as those of the pixel structure 200, and thus no further description is provided hereinafter.

To sum up, the disposition of the same patterned dielectric layer adopted in the present invention allows the reflective electrode to have a surface shape conformal to the micro-bumps capable of improving the light reflectivity. Moreover, the reflective electrode is directly connected to the upper electrode of the storage capacitor. Accordingly, the present invention significantly and efficiently improves the light reflectivity of the pixel structure at lower costs without raising the complexity of fabricating the pixel structure.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure disposed on a substrate and electrically connected to a scan line and a data line, the pixel structure having a reflective area and the pixel structure comprising:
   a common line;
   a semiconductor lower electrode disposed on the substrate within the reflective area and electrically connected to the common line;
   an upper electrode disposed above and electrically isolated from the semiconductor lower electrode;
   a patterned dielectric layer disposed on the upper electrode and exposing a part of the upper electrode, the patterned dielectric layer comprising a plurality of micro-bumps;
   a reflective electrode disposed on the patterned dielectric layer and the part of the upper electrode, the reflective electrode being electrically connected to the upper electrode; and
   an active device disposed on the substrate and electrically connected to the scan line, the data line, and the reflective electrode.

2. The pixel structure of claim 1, wherein the pixel structure further comprises a transmissive area and a pixel electrode disposed in the transmissive area, and the pixel electrode is electrically connected to the reflective electrode.

3. The pixel structure of claim 1, further comprising a gate insulating layer disposed between the upper electrode and the semiconductor lower electrode, so as to form a storage capacitor between the semiconductor lower electrode and the upper electrode.

4. The pixel structure of claim 1, wherein the patterned dielectric layer further comprises a first contact hole through which the reflective electrode is electrically connected to the active device.

5. The pixel structure of claim 1, wherein the patterned dielectric layer further comprises a second contact hole through which the semiconductor lower electrode is electrically connected to the common line.

6. The pixel structure of claim 1, wherein the active device comprises a top-gate thin film transistor (TFT).

7. The pixel structure of claim 1, wherein the active device has a semiconductor layer comprising a drain region connected to the reflective electrode, and the active device is electrically connected to the reflective electrode through the drain region.

8. The pixel structure of claim 7, wherein the semiconductor lower electrode and the semiconductor layer of the active device consist of a same thin film.

9. The pixel structure of claim 1, wherein the material of the semiconductor lower electrode comprises polysilicon.

10. The pixel structure of claim 1, wherein the material of the upper electrode is the same as the material of the reflective electrode.

11. The pixel structure of 1, wherein the material of the reflective electrode comprises aluminum, molybdenum, or titanium.

12. The pixel structure of 1, wherein the reflective electrode is in conformity with the patterned dielectric layer.

* * * * *